United States Patent [19]

Johnson

[11] Patent Number: 4,854,391

[45] Date of Patent: Aug. 8, 1989

[54] HAND PROPELLED SOIL CULTIVATION TOOL

[76] Inventor: Alan L. Johnson, RR 1, Box 815, Pine River, Minn. 56474

[21] Appl. No.: 161,719

[22] Filed: Feb. 29, 1988

[51] Int. Cl.[4] .......................... A01B 3/02; B62B 1/20
[52] U.S. Cl. ........................................ 172/354; 16/115;
 280/47.315; 172/365; 172/726; 172/698
[58] Field of Search .............. 172/354, 359, 351, 365,
 172/329, 698, 701, 353, 360, 361, 362, 366, 376,
 765, 769, 42, 43, 730, 732, 745, 771, 721, 726;
 16/115, 111 R, 111 A; 111/82; 280/47.315,
 47.37 R, 47.17, 655

[56] References Cited

U.S. PATENT DOCUMENTS

| | | | |
|---|---|---|---|
| 72,852 | 12/1867 | Hess | 172/354 |
| 177,390 | 5/1876 | Finson | 172/359 |
| 272,854 | 2/1883 | Budlong | 172/671 |
| 309,452 | 12/1884 | Ruford | 172/720 |
| 348,760 | 9/1886 | McGee | 172/354 |
| 401,297 | 3/1889 | Owen | 172/698 X |
| 422,718 | 3/1890 | Cameron | 172/730 |
| 834,445 | 10/1906 | Becker | 172/366 |
| 1,412,614 | 3/1922 | Huston | 172/698 |
| 1,636,936 | 7/1927 | Griggs | 172/730 |
| 2,320,024 | 5/1943 | Anderson | 172/671 |
| 2,992,690 | 7/1961 | Rabuse | 172/770 |
| 3,132,539 | 5/1964 | Hotz | 172/43 X |
| 4,077,479 | 3/1978 | Tibbs | 172/730 |
| 4,482,020 | 11/1984 | Jarvis | 172/745 X |

FOREIGN PATENT DOCUMENTS 1037442  9/1953  France ............................ 172/359

OTHER PUBLICATIONS

"Green River Tool Catalog", published by Green River Tools, 5 Cotton Mill Hill, Brattleboro, VT, pp. 10–11.

Primary Examiner—Richard J. Johnson
Assistant Examiner—Jeffrey L. Thompson

[57] ABSTRACT

A hand propelled soil cultivation tool for accepting several different cultivation implements is described which includes a forward gauge wheel and a quick adjustment means for handle length. The different tool attachments described include a hoe implement, a cultivation tine implement and a trenching implement. The hoe implement has a "V" shaped light gauge blade construction which is rigidified and locked to the implement shank by opposed blade stabilizer brackets. The cultivation tine implement is formed of a single elongated piece of metal and the trenching implement is constructed of two diametrically opposed sections.

6 Claims, 2 Drawing Sheets

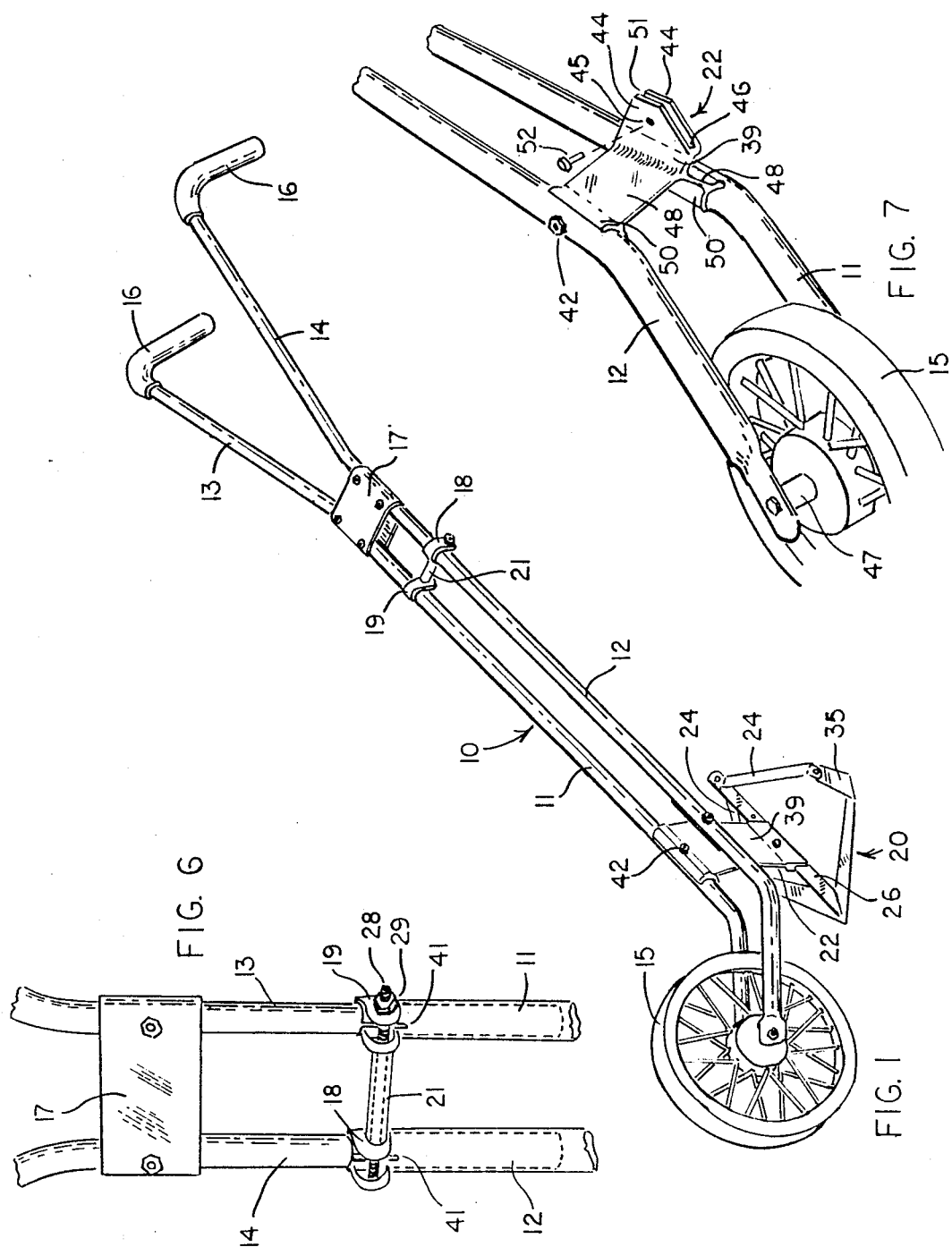

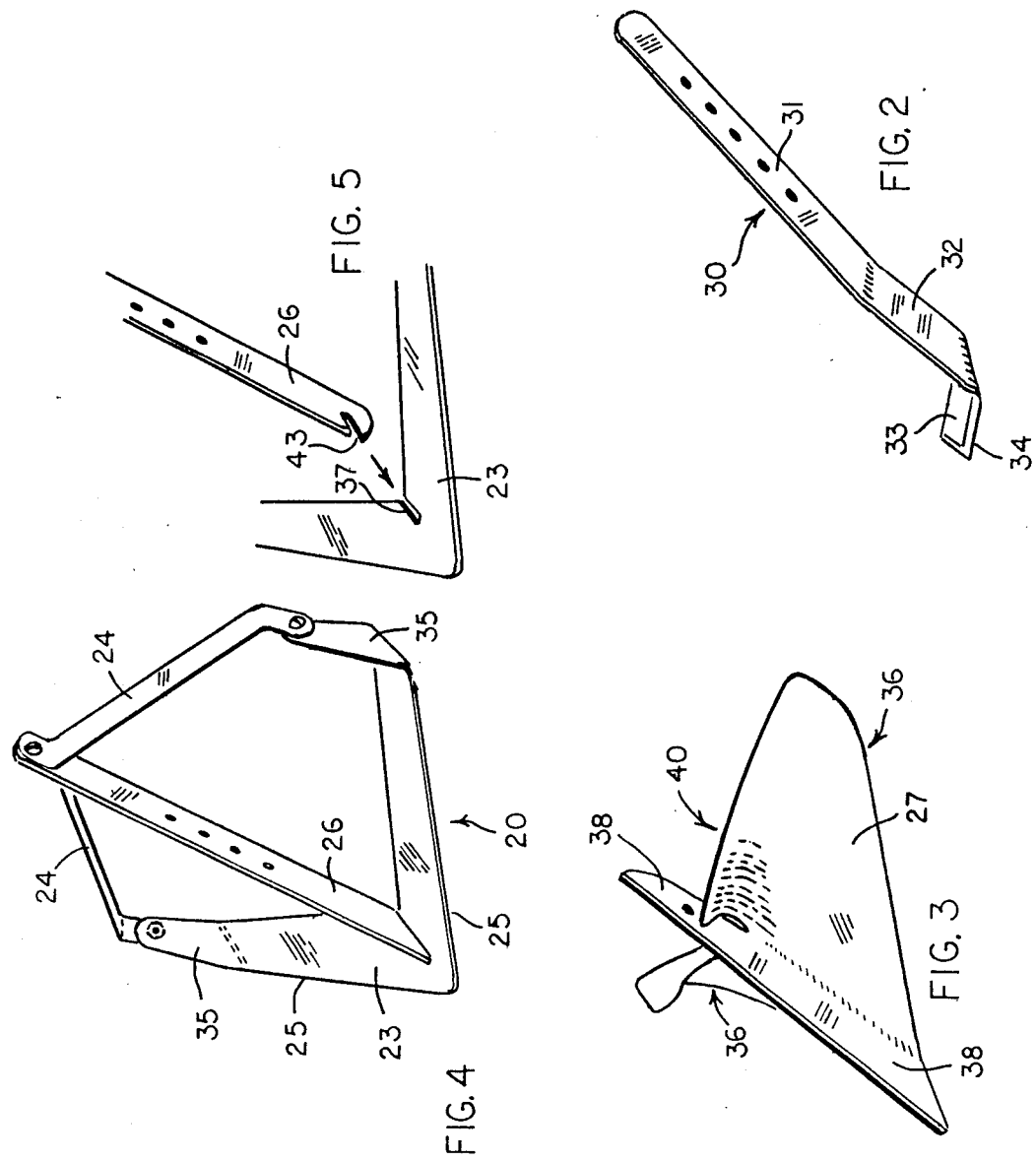

HAND PROPELLED SOIL CULTIVATION TOOL

FIELD OF INVENTION

This invention relates to soil cultivation tools and particularly to an improved hand propelled soil cultivator used primarily for plant husbandry.

DISCUSSION OF PRIOR ART

Conventional hand propelled cultivators are not equipped with a means of quickly adjusting the length of the handles to correspond to the size of the operator so that the operator can gain maximum mechanical advantage in propelling the cultivator.

Conventional hand propelled cultivators also do not provide for the adjustment or change of cultivation implements without the use of tools as described by the present invention.

Prior art does not teach the design of hand propelled cultivators to fully utilize mass production methods of manufacture such as tube bending, metal extrusion, metal die stamping, plastic dip molding, and plastic injection molding to reduce manufacturing costs. the present invention can be manufactured without welding, forging, or other expensive operations. See for example, U.S. Pat. Nos. 72,852, issued Dec. 31, 1867 to G.H. Hess; 177,390, issued May 16, 1876 to C.H. Finson; 272,854, issued Feb. 27, 1883 to L.A. Budlong; 2,320,024, issued May 25, 1943 to P.J. Anderson.

Prior art does not teach a rigid frame construction for a weeding and tilling implement which allows the use of light gauge metals for the blade, particularly which avoids the necessity of welding or forging in the construction thereof.

Other relative but distinguishable prior art includes: U.S. Pat. Nos. 309,452, issued Dec. 16, 1884 to R. Ford; 422,718 issued Mar. 4, 1890 to H.I. Cameron; 1,412,614, issued Apr. 11, 1922 to J.T. Huston; 1,429,293, issued Sept. 19, 1922 to O. Murk; 1,636,936, issued July 26, 1927 to F.G. Griggs; 2,992,690, issued July 18, 1961 to F.M. Rabuse; 4,077,479, issued Mar. 7, 1978 to R.C. Tibbs.

OBJECTS

It is an object of the present invention to provide an improved soil cultivator which requires the minimum expenditure of effort to accomplish the various tasks for which it is designed, the primary tasks being to loosen the soil and to destroy weeds.

It is another object of the present invention to provide a cultivator which is adaptable to several cultivation tasks by providing for the interchange of various implement attachments which can be accomplished without the use of tools.

It is another object of the present invention to provide a soil cultivation tool which is economical to manufacture and easy to assemble and operate.

It is yet another object of the present invention to provide a cultivation tool which has handles which are adjustable in length to accommodate operators of various sizes, thereby allowing the point of the hand contact on the grip to be adjusted relative to the vertical distance above ground level without changing the angle of the handle shaft in relation to the plane of the ground surface, thereby allowing the correct proportional forward and downward thrust, respectively, to be transmitted to the cultivation implement at all lengths of handle adjustment.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the present invention showing the hoe implement attached.

FIG. 2 is a perspective view of the tine implement.

FIG. 3 is a perspective view of the trenching implement.

FIG. 4 is a perspective view of the hoe implement.

FIG. 5 is a perspective view showing the interconnecting notches on the disassembled hoe blade and hoe shank of the hoe implement.

FIG. 6 is a perspective view of the handle clamp assembly as viewed from the bottom side showing the binder loop clamps and associated components.

FIG. 7 is a perspective view of the implement support as viewed from a bottom and slightly forward perspective.

DESCRIPTION OF THE PREFERRED EMBODIMENTS

Referring now to FIG. 1 of the drawings, cultivator 10 includes a frame comprised of frame members 11 and 12 with rearward portions of the frame members extending upward and rearward. The forward portion of the frame members are oriented substantially on a horizontal and longitudinal axis and merge smoothly with the rearward portions in an arcuate intermediate zone. A transversely mounted axle 47 is attached to the forward end of the frame members. A rotably attached gauge wheel 15 is mounted on the axle.

Referring now to FIG. 6 and FIG. 1, disposed on the rearward end of frame members 12 and 11 are binder loop clamps 18 and 19, respectively. The clamps encompass the circumference of the upper portion of the frame members. Each said frame member has a notch 41 disposed longitudinally along the bottom and extending beyond the area encompassed by the clamps, thereby providing a means to compress frame members 11 and 12 upon handles 13 and 14, respectively. Compressive forces are applied by tightening clamp nut 29 on clamp bolt 28. The compressive forces are transferred equally to clamps 18 and 19 by a clamp spacer bushing 21 which acts to restrain inward compression forces applied by clamp bolt 28.

Referring now to FIG. 7 and FIG. 1, implement support 22 provides a rigid connection between frame members 11 and 12 at the lower end of the upwardly inclined portion of the frame members. Implement support 22 comprises an integral unit provided with a merging pair of inwardly and downwardly disposed implement support legs 48. Frame retainers 50 are located at the outer ends of the implement support legs. The frame retainers have an arcuate shape in general conformity to the circumference of the frame members, thereby providing a means to align the implement support in the correct orientation relative to the frame members and also provide a nonrotatable attachment between implement support 22 and frame members 11 and 12 when secured with a bolt or other connector 42. Implement support 22 is further comprised of an integral downward extending, longitudinally oriented attachment leg 39 which emanates from the juncture of the merging pair of implement support legs 48. The attachment leg terminates at shank stop 46. The shank stop is oriented at an angle which is in conformity to the working angle of the implement shank. A pair of rigid side plates 44 join with the attachment leg bilaterally outward of shank stop 46 to form an implement shank slot 51. The side plates each have an aperture 45 which accepts a single detachable implement retaining pin or bolt 52.

Referring now to FIGS. 1, 4, and 5. A hoe implement 20 is comprised of a horizontal hoe blade 23 which has two transversely opposed forward edges 25 directed rearward and outward from the apex of their juncture so as to form a "V" shape. The outward portions of the hoe blade are directed substantially upward to form blade vanes 35. A hoe shank 26 projects generally upward and rearward in a vertical plane at an angle which is congruous with the angle of attachment relative to implement support 22. Hoe blade 23 has a longitudinally oriented blade notch 37 projecting forward from the rear edge of the hoe blade toward the apex of the juncture of the two transversely opposed edges of the hoe blade. The hoe blade notch conjugates with a longitudinally oriented hoe shank notch 43 which is located on the lower portion of the hoe shank. The hoe shank notch is disposed rearward from the forward edge of the hoe shank, as best illustrated in FIG. 5. Diametrically opposed blade stabilizer brackets 24 connect blade vanes 35 with the upper portion of hoe shank 26, thereby placing tension on the hoe blade which prevents disengagement of the conjugated notches of the hoe blade and hoe shank. The blade stabilizer brackets also impart rigidity to hoe blade 23.

Referring again to FIG. 1, a pair of opposed handles, 13 and 14, telescope into respective frame members 11 and 12. The handles are rigidly connected to each other by handle bracket 17 at the approximate midsection of each handle. The handles are detachably secured to the frame members by the clamp means previously described. The handles are directed upward and rearward in parallelism with the frame members to a point near their mid-section where they diverge outward gradually and then are directed downward to form hand grips 16.

Referring now to FIG. 2 and FIG. 7, a tine implement 30 is comprised of a single piece of metal which is insertable between side plates 44. Tine implement 30 has a shank upper portion 31 which lies at an angle congruous with the angle of attachment relative to implement support 22. The tine shank upper portion merges into tine shank offset portion 32 which begins at a first bend which occurs along a horizontal plane as the tine implement lies in its correct orientation. The tine shank offset portion merges into tine blade 33 at a second bend which is opposed to the first bend. The second bend also occurs along a horizontal plane as tine implement 30 lies in its correct orientation. The tine blade is oriented in a horizontal plane as the tine implement lies in its correct orientation. The tine blade has forward facing sharpened edges 34 to facilitate cultivation of the soil during advancement of the implement through the ground. The tine shank upper portion contains apertures congruous with attachment means of implement support 22.

Referring to FIG. 3 and FIG. 7, a trenching implement 40 is comprised of a pair of bilateral, diametrically opposed sections 36. Each section is formed of a single piece of metal, and has a moldboard portion 27 flared outward and upward to progressively dispose soil into the form of a furrow by the movement of the trenching implement through the soil, and a shank portion 38 which merges into moldboard portion 27. Each shank portion is rigidly joined to the shank portion of the opposing section and configured and oriented so that the joined shank portions 38 form an implement shank which is insertable into implement shank slot 51, and is removably attachable thereto by a bolt or pin.

OPERATION

As heretofore indicated, cultivator 10 is a non-powered device particularly adapted to weeding and other soil cultivation tasks.

Gauge wheel 15 assists in controlling the depth of soil penetration of implements attached to this device.

The handle is made adjustable in length by binder loop clamps 18 and 19. Loosening clamp nut 29 simultaneously relieves the compression on binder loop clamps 18 and 19 thereby reducing the constriction of frame members 11 and 12 upon handles 13 and 14, respectively, thereby allowing the unrestricted movement of handles 13 and 14 within frame members 11 and 12 respectively. This makes possible the adjustment of the handles to the preferred position relative to frame members 11 and 12. Subsequent tightening of clamp bolt nut 29 locks the handles into position by compressing the binder loop clamps upon the frame members. Longitudinal notches disposed on rearward portions of the frame tubes facilitate deflection of the frame members into compression against the handles. Clamp spacer bushing 21 restricts inward movement of the inward sides of the binder loop clamps and also acts to rigidify the frame members when the spacer bushing is compressed between the binder loop clamps.

Implement support 22, provides a means to removably attach an implement by means of a single pin, thumbscrew, or similar connector, thereby eliminating the necessity of tools to attach or adjust the attachment position of implements used on cultivator 10. The single pin attachment is accomplished by utilization of a shank stop 46 acting upon the upper edge of an attached implement shank to restrict the rotation of the implement shank about the axis of pin 52. Side plates 44 project along either side of an attached implement shank to restrict the lateral movement of the implement shank in relation to the implement support.

Hoe blade 23 eradicates weeds by cutting them off one or two inches below ground level. The hoe blade also loosens soil compaction during the cultivation process by displacing soil particles upward. The "V" shape of hoe blade 23 sloughs off weeds and other debris during forward advancement of hoe implement 20 through the soil, thereby reducing or eliminating the accumulation of debris on the leading edge of the blade. The blade vanes 35 of hoe blade 23 act as rudders to restrain lateral movement of the hoe blade through the soil thereby reducing the blade's tendency to divert from a straight course through the soil.

Trenching implement 40 forms a trench by the progressive upward and outward displacement of soil which occurs during the movement of the trenching implement through the soil. The trench so formed can be used as a furrow into which seeds, bulbs or tubers are planted. Trenching implement 40 can also be used to hill potatoes or other crops. The illustrated configuration of trenching implement 40 promotes economical manufacturing methods.

The tine implement 30 can be used to cultivate the soil to depths of 4 inches or more. The primary purpose of the tine implement is to loosen deep soil compaction to improve soil drainage and aeration.

While the above description contains many specificities, these should not be construed as limitations on the scope of the invention, but rather as an exemplification of one preferred embodiment thereof. Many other variations are possible, for example, frame members could telescope into the handle members instead of handle members into frame members. Accordingly, the scope of the invention should be determined not by the embodiment illustrated, but by the appended claims and their legal equivalents.

I claim:

1. A soil cultivator device comprising a frame having a pair of laterally spaced frame members with forward and rearward ends, a gauge wheel rotatably mounted on an axle connected to the forward end of the frame members, rearwardly extending handles carried by the frame, a downwardly projecting implement support secured rigidly to the frame members, said implement support detachably securing an implement shank for an implement attachment, said implement support including rigid side plates, said rigid side plates extending downward on either side of said implement shank to form an implement shank slot to restrict lateral movement of the implement shank, said side plates each having an aperture which accepts an implement retaining pin or bolt, said implement shank pivotally mounted on said retaining pin or bolt, said implement support restraining pivotal movement of said implement shank upon said implement retaining pin or bolt by means of a shank stop which acts upon an edged of said implement shank, said shank stop oriented parallel to the implement shank when said implement shank is secured in said shank slot.

2. The soil cultivator device of claim 1 wherein said implement is a hoe implement comprising a horizontal hoe blade having two transversely opposed edges directed backward and outward so as to form a "V" shape, said implement shank projecting upwardly and rearwardly from the apex of said hoe blade, a vane means disposed on each outer end of said hoe blade, each vane means consisting of a planar element disposed substantially vertically from the hoe blade, diametrically opposed bilateral blade stabilizer brackets attached to each said vane means, said blade stabilizer brackets each directed upward and inward to a connection point on an upper portion of said implement shank whereon said blade stabilizer brackets are secured thereto, said implement shank having at least one horizontal aperture alignable with said side plate apertures for receiving said implement retaining pin or bolt.

3. The soil cultivator device of claim 1 wherein said implement is a tine implement comprising a single elongated polygonal piece of metal of greater width than thickness, said implement shank being integral with the upper portion of the tine implement, said shank merging into an offset portion at a first bend which occurs along a substantially horizontal plane as said tine implement lies in an earth working position, said offset portion merging into a tine blade at a second bend having an opposed angle to said first bend, said second bend occurring along a substantially horizontal plane as said tine implement lies in an earth working position, said tine blade oriented in a generally horizontal plane and having a substantially forward facing sharpened edge to facilitate cultivation of the soil during advancement of said implement through the ground.

4. A telescoping handle assembly for a soil cultivator device comprising a frame having forward and rearward ends, said frame comprised of two tubular frame members each directed generally rearward and upward in parallel alignment with each other, a binder loop clamp encompassing the circumference of the rearward end of each said tubular frame member, rearward ends of said tubular frame members each having a notch disposed longitudinally for a distance of at least the width of said binder loop clamps, each binder loop clamp having projecting portions with apertures for receiving a means, such as a bolt, to apply compressive force to both binder loop clamps simultaneously, a means, such as a spacer bushing, extending between the projecting portions to restrict inward movement of the binder loop clamps, a left handle member and a right handle member each with forward portions lying in parallel alignment with each other, said forward portions of each said handle member configured and oriented to allow said forward portions of said handle members to telescope into the rearward ends of each respective said tubular frame member.

5. A hoe blade assembly for a soil cultivator implement comprising a hoe shank having an upper end and a lower end, wherein said lower end is attached to a substantially horizontal hoe blade, said hoe shank projecting upward and rearward from the upper surface of said hoe blade, said hoe blade having two transversely opposed edges directed backward and outward from the apex of their juncture to an outer end so as to form a "V" shape, vane means disposed on each outer end of said hoe blade, each vane means consisting of a planar element disposed substantially vertically from the hoe blade, bilateral diametrically opposed blade stabilizer brackets attached to each said vane means, each said blade stabilizer bracket disposed upward and inward to a connection point on the upper end of said hoe shank whereon said blade stabilizer brackets are secured thereto, a longitudinally oriented notch projecting forwardly from the rear edge toward the apex of said hoe blade, a corresponding longitudinally oriented notch projecting rearwardly from the forward edge of the lower end of said hoe shank, said notches being fitted together to provide a conjugated attachment means of the hoe blade to the hoe shank.

6. A trenching implement for a soil cultivator device comprising a pair of bilateral transversely opposed sections, each said section formed of a single piece of material having a moldboard portion flared outward and upward as a means to progressively dispose soil into a furrow as the implement is moved through the soil, each said section having a shank portion located on the upward and forward portion of said section, each said shank portion merging into the moldboard portion of the respective section, each said shank portion of said opposed sections rigidly jdoined to each other and configured and oriented so that the joined shank portions form an implement shank which is congruous with an implement attachment means provided by an implement support, said implement shank having at least one horizontally disposed mounting aperture for alignment with a corresponding aperture in said implement support.

* * * * *